(12) United States Patent
Boling et al.

(10) Patent No.: US 7,102,510 B2
(45) Date of Patent: Sep. 5, 2006

(54) ASSET LOCATION TRACKING SYSTEM

(75) Inventors: Brian Boling, Knoxville, TN (US); Ron Bishop, Trabucco Canyon, CA (US)

(73) Assignee: Procon, Inc., Knoxville, TN (US)

( * ) Notice: Subject to any disclaimer, the term of this patent is extended or adjusted under 35 U.S.C. 154(b) by 0 days.

(21) Appl. No.: 10/858,758

(22) Filed: Jun. 2, 2004

(65) Prior Publication Data

US 2005/0026627 A1 Feb. 3, 2005

Related U.S. Application Data

(60) Provisional application No. 60/475,322, filed on Jun. 3, 2003.

(51) Int. Cl.
*G08B 1/08* (2006.01)

(52) U.S. Cl. .............................. 340/539.13; 340/686.1; 455/456.1

(58) Field of Classification Search ........... 340/539.13, 340/990, 991, 425.5, 426.19, 426.2, 539.2, 340/686.1, 825.69, 825.49; 455/456.1, 457; 701/213
See application file for complete search history.

(56) References Cited

U.S. PATENT DOCUMENTS

| | | | |
|---|---|---|---|
| 5,576,716 A * | 11/1996 | Sadler | 342/357.07 |
| 5,835,377 A * | 11/1998 | Bush | 700/99 |
| 6,496,777 B1 | 12/2002 | Tennison et al. | 701/213 |
| 6,838,998 B1 * | 1/2005 | Brown et al. | 340/825.49 |
| 2003/0190911 A1 * | 10/2003 | Hirano | 455/423 |
| 2003/0222819 A1 * | 12/2003 | Karr et al. | 342/457 |
| 2004/0201520 A1 * | 10/2004 | Flick | 342/357.07 |
| 2004/0203909 A1 | 10/2004 | Koster | 455/456.1 |
| 2004/0243430 A1 * | 12/2004 | Horstemeyer | 705/1 |

\* cited by examiner

Primary Examiner—Phung T. Nguyen
(74) Attorney, Agent, or Firm—Luedeka, Neely & Graham

(57) ABSTRACT

The invention provides an asset location tracking system for tracking the position of a mobile asset, such as an automobile, boat or airplane. The tracking system includes a mobile unit for installation in the mobile asset. The mobile unit includes a position locating unit, such as a GPS unit, for generating position information indicative of the position of the mobile asset, and a wireless transmitter, such as a cellular transmitter, for wirelessly transmitting the position information. The tracking system also includes a central processing system that includes a wireless receiver, such as a cellular receiver, for receiving the position information transmitted by the wireless transmitter. The central processing system also includes a processor for operating on the position information to format it to be accessible at a network address on a global communication network such as the Internet. The tracking system includes a customer computer that can access to the network address on the global communication network to display the position information. In preferred embodiments, the position information is displayed as a graphical indicator, such as a "push pin," on a map or aerial photograph displayed a webpage accessed by the customer computer.

15 Claims, 9 Drawing Sheets

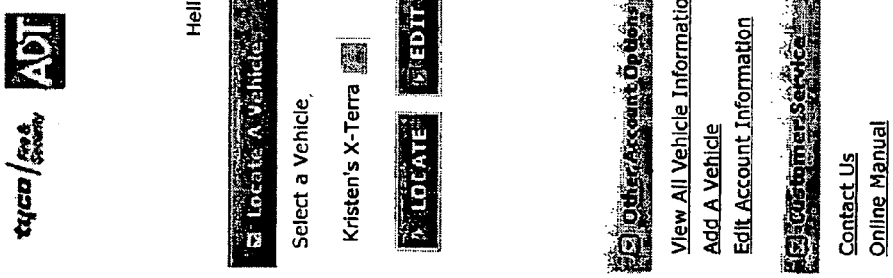
Fig. 4

Fig. 7 tyco / Fire & Security ADT  ADT TRAK™

Logout | About ADT | About Mobilesafety | FAQ | Contact

Hello Ron !

Edit Your vehicle

- Locate A Vehicle

Select a Vehicle

Marilu's Jeep    ▸ LOCATE    ▸ EDIT

- Other Account Options
  - View All Vehicle Information
  - Add A Vehicle
  - Edit Account Information
- Customer Service
  - Contact Us
  - Online Manual

MobileSafety™ from ADT

©Copyright 2003 ADT

Legal

| | |
|---|---|
| MobileSafety Information | |
| MobileSafety Serial # | 08831099 |
| Vehicle Information | |
| Description for your Vehicle | Marilu's Jeep |
| Make | Snapper |
| Model | Mowboy |
| Year | 1969 |
| Color | Red/White |
| VIN # | SD87A9797979 |
| License Plate # / State Issued | HIGRAS    MT |
| Roadside Assistance provider Information | |
| Provider Name | SecureAlert Telematic |
| Membership Number | sd808as0d8a0 |
| MemberShip Password or PIN if any | 93874 |

[Update Information]

Fig. 9 tyco ADT

ADT TRAK

Log

Mobilesafety | FAQ | Contact

Hello Ron !

 Locate A Vehicle

Select a Vehicle

Marilu's Jeep 

 LOCATE   EDIT

To Edit a vehicle click the description

| Description | Make | Model | Model Year | Roadside Assistance |
|---|---|---|---|---|
| Kristen's X-Terra | Nissan | X-Terra | 2003 | AAA |
| Marilu's Jeep | Snapper | Mowboy | 1969 | SecureAlert Telematics |
| Ron's Airplane | Rockwell | Commander | 2003 | AAA |
| Brennan's Tahoe | test | | | |
| Ron's Jeep | New | | | AAA |
| Tim's Car | 2000 | | | AAA |
| Mike's Mustang | Test | test | 1000 | |
| JOHN'S CAR | LTN | LS8 | 2003 | |

 Account Options

View All Vehicle Information
Add A Vehicle
Edit Account Information

 Customer Service

Contact Us
Online Manual

MobileSafety™ from ADT
©Copyright 2003 ADT
Legal

ASSET LOCATION TRACKING SYSTEM

This application claims priority to U.S. provisional patent application Ser. No. 60/475,322 filed Jun. 3, 2003, titled VEHICLE LOCATION TRACKING SYSTEM.

FIELD

This invention relates to the field of asset tracking. More particularly the invention relates to a combination of Global Positioning System (GPS), cellular telephone and Internet technologies to provide for real-time tracking of an asset.

BACKGROUND

Often situations arise in which an owner of an asset, such as a automobile, wishes to confirm the location of the asset when the asset is out of the owner's control. For example, when a parent allows a teenage son or daughter to take the family car for an outing, the parent may wish to verify the location of the car at any time during the outing. As another example, a business entity operating a fleet of vehicles may wish to monitor the location of each of the vehicles during the course of business operations. As a further example, the owner of a stolen vehicle may wish to monitor the location of the vehicle and provide law enforcement officers such information to aid in recovery of the vehicle.

What is needed, therefore, is a system capable of determining the location of an asset in real-time, or near real-time, and reporting the location information to the owner of the asset or to another who is authorized to receive such information.

SUMMARY

The above and other needs are met by an asset location tracking system for tracking the position of a mobile asset, such as an automobile, boat or airplane. The tracking system includes a mobile unit for installation in the mobile asset. The mobile unit comprises a position locating unit, such as a GPS unit, for generating position information indicative of the position of the mobile asset. The mobile unit also includes a wireless transmitter, such as a cellular transmitter, for wirelessly transmitting the position information. The tracking system also includes a central processing system comprising a wireless receiver, such as a cellular receiver, for receiving the position information transmitted by the wireless transmitter. The central processing system further includes a processor for operating on the position information to format the position information to be accessible at a network address on a global communication network such as the Internet. The tracking system includes the global communication network in communication with the central processing system and in communication with a customer computer. The customer computer has access to the network address on the global communication network, and can access and display the position information.

In preferred embodiments of the invention, the position information is displayed as a graphical indicator, such as a "push pin," on a map or aerial photograph displayed a webpage accessed by the customer computer.

In another aspect, the invention provides a method for tracking a location of a mobile asset, such as an automobile, boat or airplane. The method includes the steps of accessing an asset tracking webpage on a customer computer by way of a global communication network, such as the Internet, and selecting an asset from a list of assets displayed on the asset tracking webpage. The method includes transmitting a wireless activation signal to a mobile unit collocated with the asset, receiving the wireless activation signal at the mobile unit, and generating asset position information at the mobile unit in response to the wireless activation signal. The method also includes wirelessly transmitting the position information from the mobile unit, receiving the position information, and generating position coordinates based on the received position information. The method further includes accessing a map of an area that includes the location indicated by. the position coordinates, generating a graphical position indicator on the map to form an annotated map, accessing the annotated map via the global communication network, and displaying the annotated map accessed over the global communication network at a customer computer.

Using the invention, the location coordinates of an asset can be determined in near real time. The owner of the asset, or others authorized by the owner, can view the location of the asset on a map or aerial photograph displayed on a webpage. In this manner, the owner can track the location of the asset anywhere in the world from anywhere in the world at which the owner can gain access to the Internet.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein:

FIG. 4 depicts a first customer interface screen according to a preferred embodiment of the invention;

FIG. 7 depicts a fourth customer interface screen according to a preferred embodiment of the invention;

FIG. 9 depicts a sixth customer interface screen according to a preferred embodiment of the invention.

DETAILED DESCRIPTION

Figure 1:
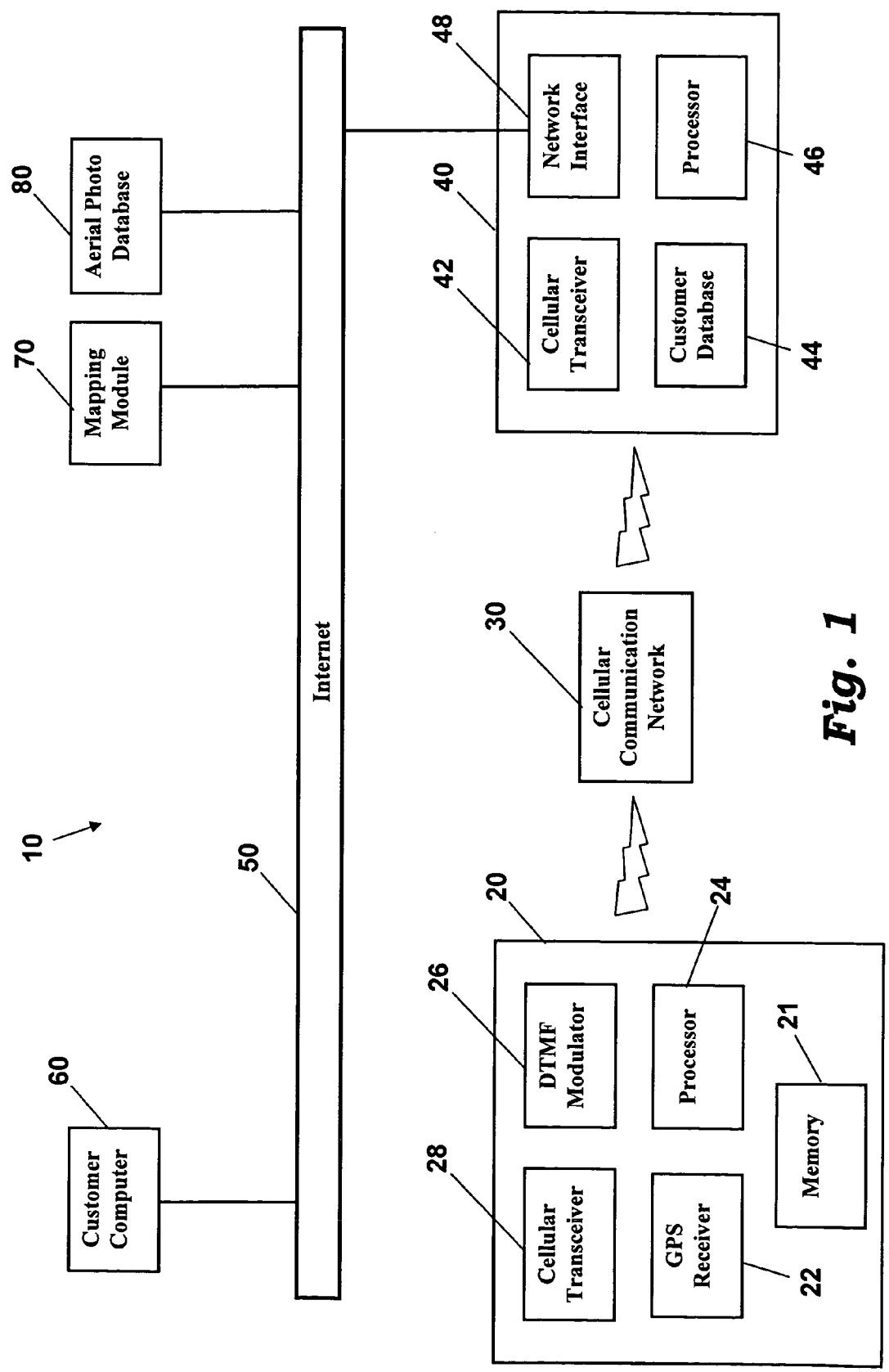
FIG. 1 depicts an asset tracking system according to a preferred embodiment of the invention.

Depicted in FIG. 1 is an asset location tracking system 10 according to a preferred embodiment of the invention. The system 10 includes a mobile unit 20, a cellular communication network 30, a central processing system 40, a global communication network 50, a customer computer 60, a mapping module 70, and an aerial photographic database 80. The components of the system 10 and the preferred methods of operation are described in detail herein.

A brief overview of the operation of the tracking system 10 is provided first, followed by a more detailed description of the components of the system 10. With reference to FIG. 1, a customer accesses the system 10 by way of the customer computer 60. The user of the system is referred to herein as a customer, as it is envisioned that the preferred embodiment of the system 10 will be subscriber based. It should be appreciated that the customer, for purposes of this description, is an individual or entity having authority to access information regarding a mobile asset in which the mobile unit 20 is installed.

The customer computer 60 is connected to a global communication network 50, such as the Internet. Using a browser on the customer computer 60 (such as Internet Explorer or Netscape browser software), the customer accesses a webpage on the central processing system 40. On the webpage, the customer logs in and provides information indicating which asset the customer wishes to locate. The central processing system 40 then communicates with the mobile unit 20 via the cellular communication network 30. Initiated by the communication from the central processing system 40, the mobile unit 20 determines its location coordinates based on GPS processing. The mobile unit 20 communicates the GPS coordinates via the cellular network 30 to the central processing system 40, which places the coordinate information on a webpage accessible by the customer. Preferably, the coordinate information is communicated to the customer graphically, such as by indicating the location on a map generated by the mapping module 70 and displayed on the webpage. Alternatively, or additionally, the location information is communicated by indicating the location on an aerial photograph accessed from the aerial photograph database 80 and displayed on the webpage. The customer preferably accesses the webpage showing the location information via the Internet 50 using the browser software on the customer computer 60.

Preferably, the mobile unit 20 is a self-contained portable device that is collocated with a mobile asset to be tracked, such as an automobile, boat or airplane. The mobile unit 20 includes a Global Positioning System (GPS) receiver 22, a processor 24, a DTMF modulator 26, and a cellular transceiver 28. In the preferred embodiment, the mobile unit 20 is powered by the power system in the vehicle or other asset in which it is located. In one embodiment, the components of the mobile unit 20 are contained within a portable housing having a power cord and plug compatible with a standard 12 volt power receptacle in a vehicle such as an automobile or boat. In this embodiment, the mobile unit 20 may be easily moved from one asset to another. For example, it may be easily transferred from the customer's car to the customer's boat by simply unplugging the power cord from the 12 volt receptacle in the car and plugging into the receptacle in the boat.

In an alternative embodiment, the mobile unit 20 is semi-permanently installed in a dashboard or console of an automobile, boat or other mobile asset. One example of the mobile unit 20 is described in pending U.S. patent application Ser. No. 10/202,769 filed Jul. 25, 2002. Another example of the mobile unit 20 is the Travel Guardian III™ device manufactured by SecureAlert Telematics, Inc. of Knoxville, Tenn.

The GPS receiver 22 receives signals transmitted from GPS satellites in earth orbit. Based on these signals, the GPS receiver 22 determines coordinates of the location of the mobile asset in which the mobile unit 20 is installed. Preferably, these coordinates are expressed in longitude and latitude format. However, it should be appreciated that the invention is not limited to operation in any particular coordinate system.

In the preferred embodiment, the processor 24 accesses the location coordinates from the GPS receiver 22 and formats the coordinates for transmission over the cellular network 30. In one embodiment, the processor 24 formats the coordinates as a string of characters suitable for transmission in digital cellular format. Besides the location information, the string may also include an identification number for the mobile unit and a timestamp indicating the time at which the location coordinates were determined. Preferably, the location coordinates and timestamp are stored in a storage device 21 within the mobile unit 20, so that location information may be recalled from memory and transmitted at any later time.

In a preferred embodiment, the processor 24 communicates the location coordinates, timestamp, and identification information to a DTMF modulator 26. The DTMF modulator 26 generates a string of DTMF tones which encode the location, time, and identification information.

The location information, whether in digital cellular or DTMF format, is provided to the cellular transceiver 28 for transmission over the cellular communication network 30, preferably according to standard cellular communication protocol. In the preferred embodiment, the location information is received by a cellular transceiver 42 which is preferably a component of the central processing system 40.

As shown in FIG. 1, the central processing system 40 includes a processor 46 that controls the various functions of the central processing system 40. The system 40 also includes a customer database 44 that is hosted on a server and that stores customer information, such as identification information for the customer and the customer's vehicles, and billing information. The server on which the customer database 44 resides preferably runs Windows 2000 or above with IIS and ASP.NET. In the preferred embodiment, the database 44 is compatible with SQL Server Version 2000. For emailing from the system 40, CDOSYS libraries are preferably available in the hosted server. The system 40 includes a network interface 48 for enabling communication between the system 40 and the Internet 50.

Based on the coordinate information communicated from the mobile unit 20 to the central processing system 40, the system 40 communicates with the mapping module 70 to access a map of the area in which the mobile asset is located. In the preferred embodiment, the mapping module 70 is accessible over the Internet 50, such as provided by MapPoint.NET. In an alternative embodiment, the mapping module 70 is a component of the central processing system 40.

Based on the coordinate information communicated from the mobile unit 20 to the central processing system 40, the system 40 is capable of communicating with the aerial photograph database 80 to access an aerial photograph of the area in which the mobile asset is located. In the preferred embodiment, the aerial photograph database 80 is also accessible over the Internet 50. In an alternative embodiment, the aerial photograph database 80 is a component of the central processing system 40.

By way of the Internet 50, the processing system 40 accesses the mapping and/or aerial photograph information and displays the map and/or photograph on a webpage accessible to the customer. Preferably, the coordinates of the asset associated with the mobile unit 20 is indicated on the map and/or photograph by a dot, "push-pin" or other such graphical indicator. Using the browser on the customer computer 60 and tools accessible through the mapping engine 70 by way of the Internet 50, the customer may "zoom" in or out on the displayed map.

Figure 2:
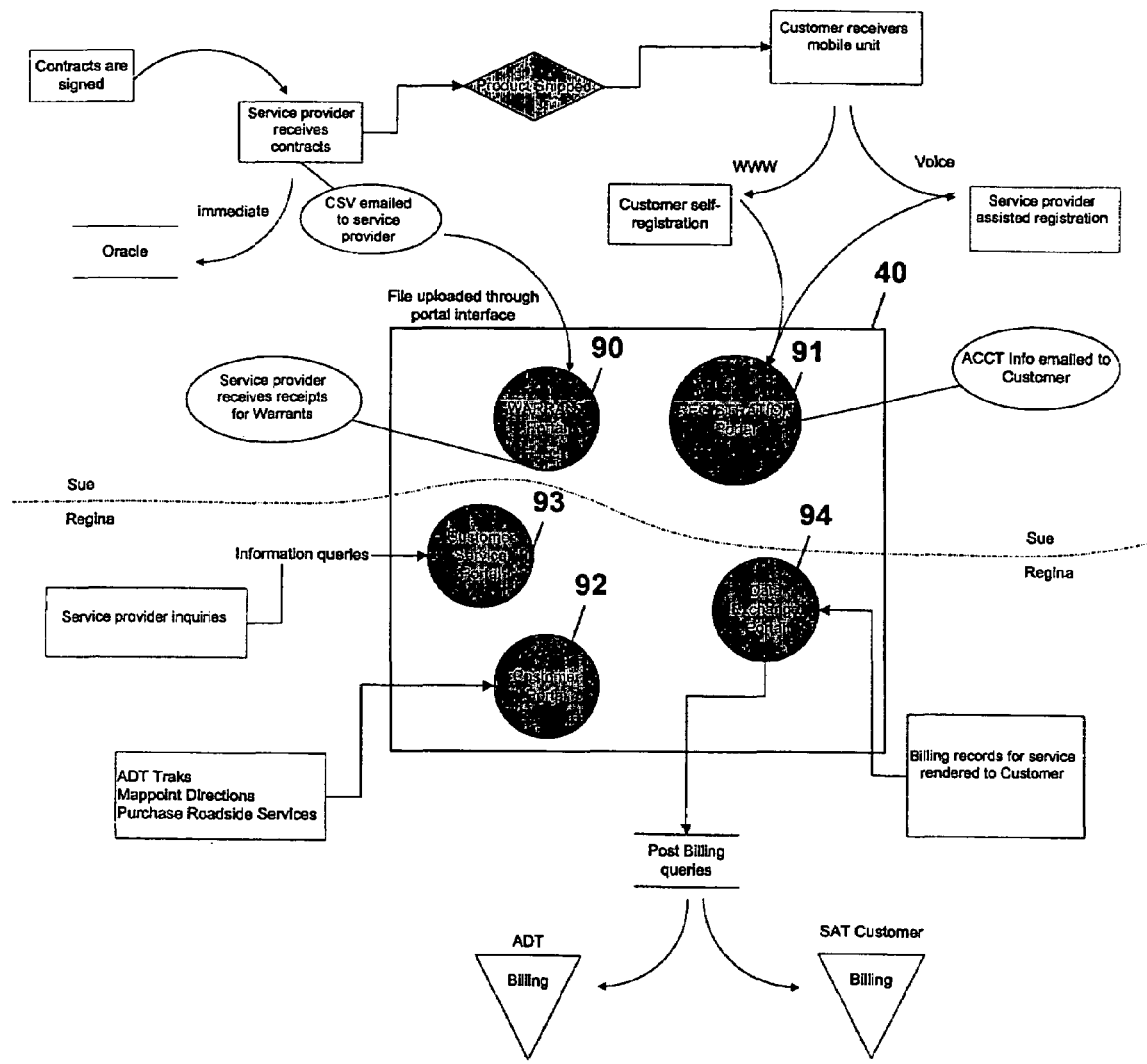
FIG. 2 depicts a functional block diagram of a portion of an asset tracking system according to a preferred embodiment of the invention.
Figure 3:
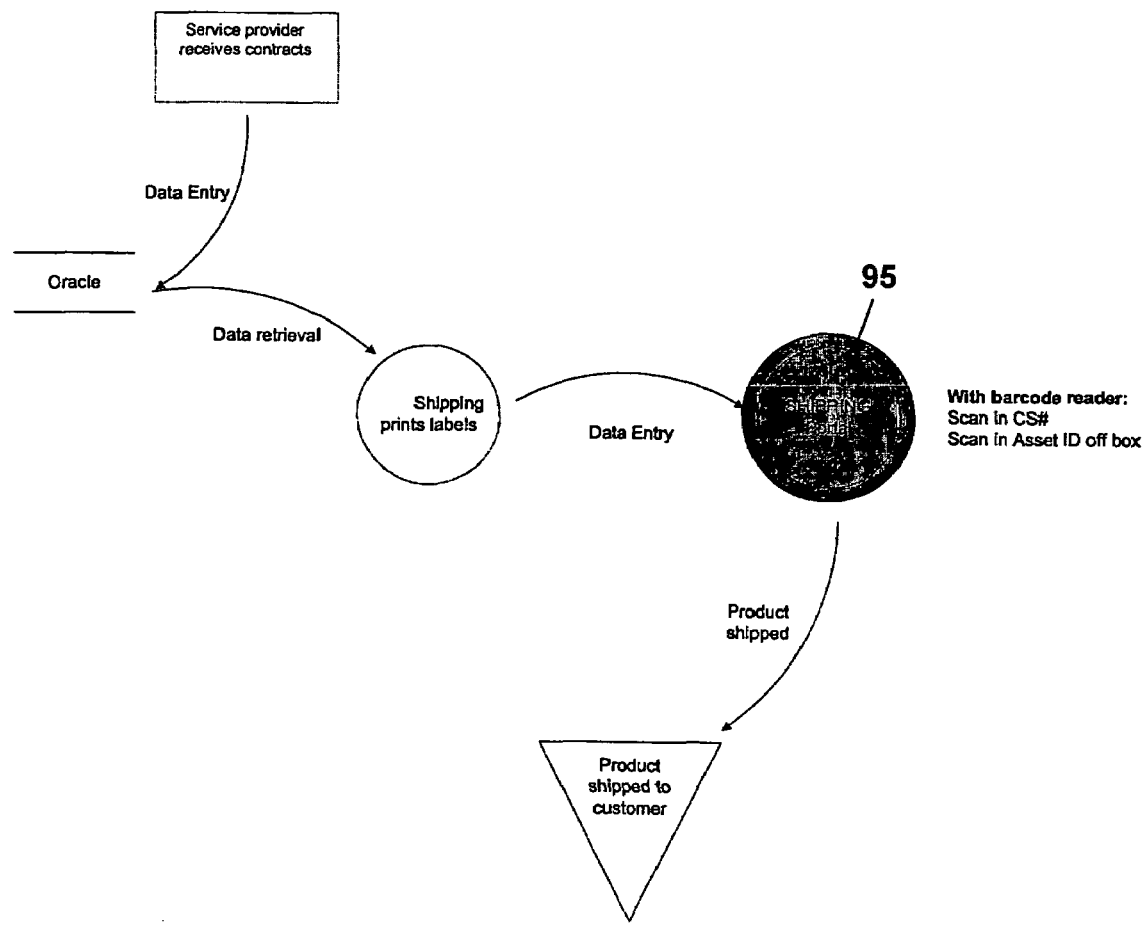
FIG. 3 depicts a functional block diagram of a portion of an asset tracking system according to a preferred embodiment of the invention.

As shown in FIG. 2, the central processing system 40 preferably includes six access portals: a warrant portal 90, a registration portal 91, a customer portal 92, a customer service portal 93, and a data exchange portal 94. The system 40 also includes a shipping portal 95 as shown in FIG. 3.

The warrant portal 90 is preferably accessible only by personnel associated with the entity operating the tracking system 10, and the central processing system 40 includes security features to ensure this requirement. The entity operating the tracking system 10 is referred to herein as the service provider. When customer enters into a contract with the service provider, the service provider 'warrants' that the entity has a newly contracted customer. The data required for the warrant portal is sent as a CSV file, which is uploaded into the warrant portal 90. Following the upload, the warrant portal 90 parses the CSV file for the required fields. Table I provides an example of data entered by way of the warrant portal 90 in a preferred embodiment of the invention.

service provider. Additionally, two timestamps are captured: the record creating date and the warrant date. While these two dates are similar, if not identical, it is preferable to delineate between the two. Also, after the upload and parsing, certain other fields within the vehicle location tracking system database tables are preferably updated.

TABLE I

| Form Name | Database Name | Description |
| --- | --- | --- |
| Clerk ID | SAT_ADT_EMPLOYEE.CLERKEMPNO | Clerk employee number |
| Sales ID | SAT_ADT_EMPLOYEE.SALESEMPNO | Sales associate employee number |
| ADT Town No | SAT_ADT_EMPLOYEE.TOWNNO | Town number relating to the customer |
| Contract No | SAT_CUSTOMER.CONTRACTNO | Customer contract number |
| ADT Customer No | SAT_CUSTOMER.ADTCUSTNO | Customer number (Oracle) |
| First Name | SAT_CUSTOMER.FNAME | First name of customer |
| Last Name | SAT_CUSTOMER.LNAME | Last name of customer |
| Email | SAT_CUSTOMER.EMAIL | If known, the customer's email address |
| <hidden> | SAT_CUST_ADDR_TYPE.DESC | =1 (PRIMARY) |
| Street Address | SAT_CUST_ADDRESS.ADDR1 | Customer's street address |
| Apt/PO Box | SAT_CUST_ADDRESS.ADDR2 | Customer's apartment or PO Box |
| City | SAT_CUST_ADDRESS.CITY | Customer's city of record |
| State | SAT_CUST_ADDRESS.STATE | Customer's state of record |
| Zip code | SAT_CUST_ADDRESS.ZIPCODE | Customer's postal code |
| Phone Number | SAT_CUST_ADDRESS.PHONE | Customer's telephone number of record |
| <hidden> | SAT_CUSTOMER.CLASS | =1 (WARRANT) |

When the warrant data is uploaded, it is captured and an email receipt of the transaction is preferably sent to the Table II describes the mapping of fields of warrant data from the CSV file to the fields within the tracking system 10.

TABLE II

| CSV_Column | CSV_Column_Description | Table | Field |
| --- | --- | --- | --- |
| 1 | 1 | Telemar Account Number | SAT_CUS_ASSETS | TELEMAR_ACCOUNT_NUMBER |
| 2 | 2 | FirstName | SAT_CUSTOMER | FIRSTNAME |
| 3 | 3 | LastName | SAT_CUSTOMER | LASTNAME |
| 4 | 4 | Address1 | SAT_CUST_ADDRESS | ADDRESS1 |
| 5 | 5 | Address2 | SAT_CUST_ADDRESS | ADDRESS2 |
| 6 | 6 | City | SAT_CUST_ADDRESS | CITY |
| 7 | 7 | State | SAT_CUST_ADDRESS | STATE |
| 8 | 8 | Zip | SAT_CUST_ADDRESS | ZIPCODE |
| 9 | 9 | PhoneNumber | SAT_CUST_ADDRESS | PHONE |
| 10 | 10 | Car Make/Model/Year | SAT_CUST_ASSETS | MAKE_MODEL_YEAR |
| 11 | 11 | Color | SAT_CUST_ASSETS | COLOR |
| 12 | 12 | VIN | SAT_CUST_ASSETS | VIN_NUMBER |
| 13 | 13 | License Plate | SAT_CUST_ASSETS | LICENSE_PLATE_NUMBER |
| 14 | 14 | 1st Contact | SAT_CUSTOMER_CONTACTS | CONTACTNAME |
| 15 | 15 | 1st Contact Phone | SAT_CUSTOMER_CONTACTS | CONTACTPHONE |
| 16 | 16 | 2nd Contact | SAT_CUSTOMER_CONTACTS | CONTACTPHONE |
| 17 | 17 | 2nd Contact Phone | SAT_CUSTOMER_CONTACTS | CONTACTPHONE |
| 18 | 18 | 3rd Contact | SAT_CUSTOMER_CONTACTS | CONTACTNAME |
| 19 | 19 | 3rd Contact Phone | SAT_CUSTOMER_CONTACTS | CONTACTPHONE |
| 20 | 20 | Roadside assistance provider | SAT_CUST_ASSETS | ROADSIDE_ASST_PROV |
| 21 | 21 | Roadside Number | SAT_CUST_ASSETS | ROADSIDE_NUMBER |
| 22 | 22 | Member Number | SAT_CUST_ASSETS | ROADSIDE_MEMBER_NUMBER |
| 23 | 23 | Quantity | SAT_CUST_ASSETS | QUANTITY |
| 24 | 24 | Billing Number (ADT Cutomer Number) | SAT_CUSTOMER | ADT_CUSTOMER_NUMBER |
| 25 | 25 | CS Number (directly relates to Ass . . . | SAT_CUST_ASSETS | ADT_CS_NUMBER |
| 26 | 26 | Ship To | SAT_CUS_ASSETS | Ship_To_1 |
| 27 | 27 | Ship To | SAT_CUS_ASSETS | Ship_To_2 |
| 28 | 28 | Ship To | SAT_CUS_ASSETS | Ship_To_3 |
| 29 | 29 | Shipped | SAT_CUS_ASSETS | Shipped |
| 30 | 30 | Processed Monitoring | SAT_CUS_ASSETS | Processed_Monitoring |

The warrant information uploaded from the warrant portal 90 is preferably processed as follows. Each row of the CSV file is processed. If the customer number is already available in the system, then the system will update the customer information. If a new customer is being processed, a new customer is created in SAT_CUSTOMER_TABLE. A new record is created in SAT_ADT_EMPLOYEE with the field values shown in Table II and the customer identification number obtained from the SAT_CUSTOMER record. A new record is created in SAT_CUSTOMER_ASSETS with the customer identification number obtained from the SAT_CUSTOMER record and other fields as shown in Table II. A new record is created in SAT_CUSTOMER_ADDRESS with the fields listed in Table II along with the customer identification number obtained from SAT_CUSTOMER. A new record is created in SAT_CUSTOMER_CONTACTS, with the fields listed in Table II along with the customer identification number obtained from SAT_CUSTOMER. If the customer already exists, these last two steps are not needed.

In the preferred embodiment, the warrant portal 90 includes the functional components listed in Table III.

TABLE III

| | |
|---|---|
| CSV File Upload | Uploads the CSV file through the upload interface provided in the warrant portal. |
| Upload Confirmation | Provides upload confirmation or errors if the upload was not successful. |
| CSV Parsing | Parses the CSV file for required data and transfers the data to corresponding table fields within the system. |
| CSV Parse Error | In case of parse error, sends an email to the appropriate personnel within the service provider. |

Through the registration portal 91, customers "register" their mobile units 20 to obtain eligibility for usage of the tracking system 10. One purpose of registration is the collection of billing information. Generally, a customer does not participate in the tracking system 10 without registration. In the preferred embodiment, there are two ways for a customer to activate the mobile unit 20: (1) self-activation, and (2) customer service assisted registration.

Preferably, customer go to a website for self-activation. On a welcome screen of the service provider's website, the customer clicks an activation hyperlink that takes them to an activation website to complete the activation process. Additionally customers preferably acknowledge the terms of service and privacy polices before submitting their account information. This may be represented by one or more check boxes with links to legal documents outlining the service and privacy policies.

In a preferred embodiment, the first step in the process is to locate the customer account. The customer completes a short web form consisting of the customer's contract number and phone number. The system then queries the customer database 44 for the criteria given to locate the customer's warrant. Preferably, both fields should match the database records. To make it easy for the customer to locate their contract number, a cross section of a sample contract is preferably provided on the screen for comparison.

Once the account has been successfully located based on the two-part criteria, the customer is directed to the last step of their activation process: security information and billing. The customer then completes the web form shown in Table IV.

TABLE IV

| Form Name | Database Name | Description |
|---|---|---|
| ### Billing Address ### | | |
| Username | SAT_CUST_SECURITY.USERNAME | Customer selects a UNIQUE username |
| Password | SAT_CUST_SECURITY.PASSWORD | Customer selects a password (4–8 chars) |
| Verify Password | SAT_CUST_SECURITY.PASSWORD | Verify that Password and Verify Password match |
| Secret Question | SAT_CUST_SECURITY.SECRET | Password recovery question |
| Secret Answer | SAT_CUST_SECURITY.SECRETANS | Password recovery answer |
| Email Address | SAT_CUSTOMER.EMAIL | Display if known. Collect if unknown. |
| ### Billing Address ### | | |
| <hidden> | SAT_CUST_ADDR_TYPE.DESC | =2 (BILLING) |
| Street Address | SAT_CUST_ADDRESS.ADDR1 | Customer's street address |
| Apt/PO Box | SAT_CUST_ADDRESS.ADDR2 | Customer's apartment or PO Box |
| City | SAT_CUST_ADDRESS.CITY | Customer's city of record |
| State | SAT_CUST_ADDRESS.STATE | Customer's state of record |
| Zip code | SAT_CUST_ADDRESS.ZIPCODE | Customer's postal code |
| Phone Number | SAT_CUST_ADDRESS.PHONE | Customer's phone number |
| ### Method of payment ### | | |
| Bank Card | SAT_CUST_PAYMENT.BANKCARD | Visa, MC, Discover, AMEX |
| Credit Card No. | SAT_CUST_PAYMENT.CCNO | Customer's credit card number |
| Expiration Mo. | SAT_CUST_PAYMENT.MONTH | Expiratory month |
| Expiration Year | SAT_CUST_PAYMENT.YEAR | Expiratory year (4 digit) |
| Name on card | SAT_CUST_PAYMENT.NAME | Name on credit card |
| Verification code | SAT_CUST_PAYMENT.VCODE | Three digit number on back of credit card |

Preferably, customers acknowledge the service provider's terms of service and privacy policies before submitting their account information. This may be represented by one or more check boxes with links to these legal documents for the customer's inspection. During this process, the customer may elect to use their current account address as their billing address insofar that their primary address matches the information of their credit statement.

When the form of Table IV is submitted, the payment information is validated and pre-authorized for an amount to be determined by the service provider. Successful pre-authorization then activates the customer's account and mobile unit 20, and the customer is able to access the tracking system 10. In the preferred embodiment, upon successful activation, the records listed in Table V are updated in the customer database 44.

TABLE V

| Database Name | Value | Description |
| --- | --- | --- |
| SAT_CUSTOMER.CLASS | =2 (ACTIVATED) | Customer account status |
| SAT_CUSTOMER.ACTDATE | Then current DATETIME | Date activation occurred |

When a customer requires the assistance of a customer service representative to activate their account and mobile device 20, the customer calls a toll-free number. The customer service representative essentially performs the steps outlined above on behalf of the customer in accordance with a phone script that mirrors the self-activation process.

Figure 5:
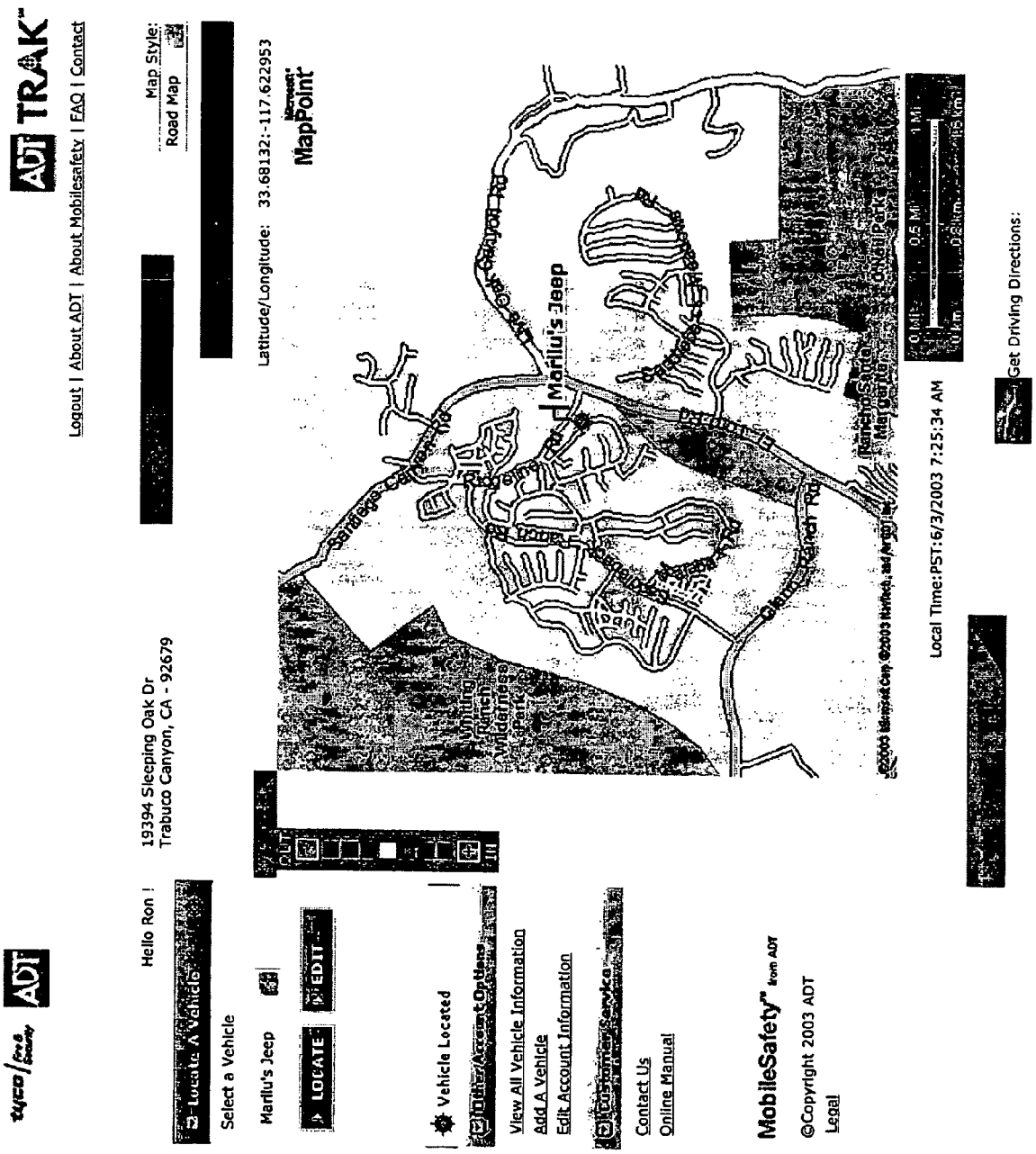
FIG. 5 depicts a second customer interface screen according to a preferred embodiment of the invention.
Figure 6:
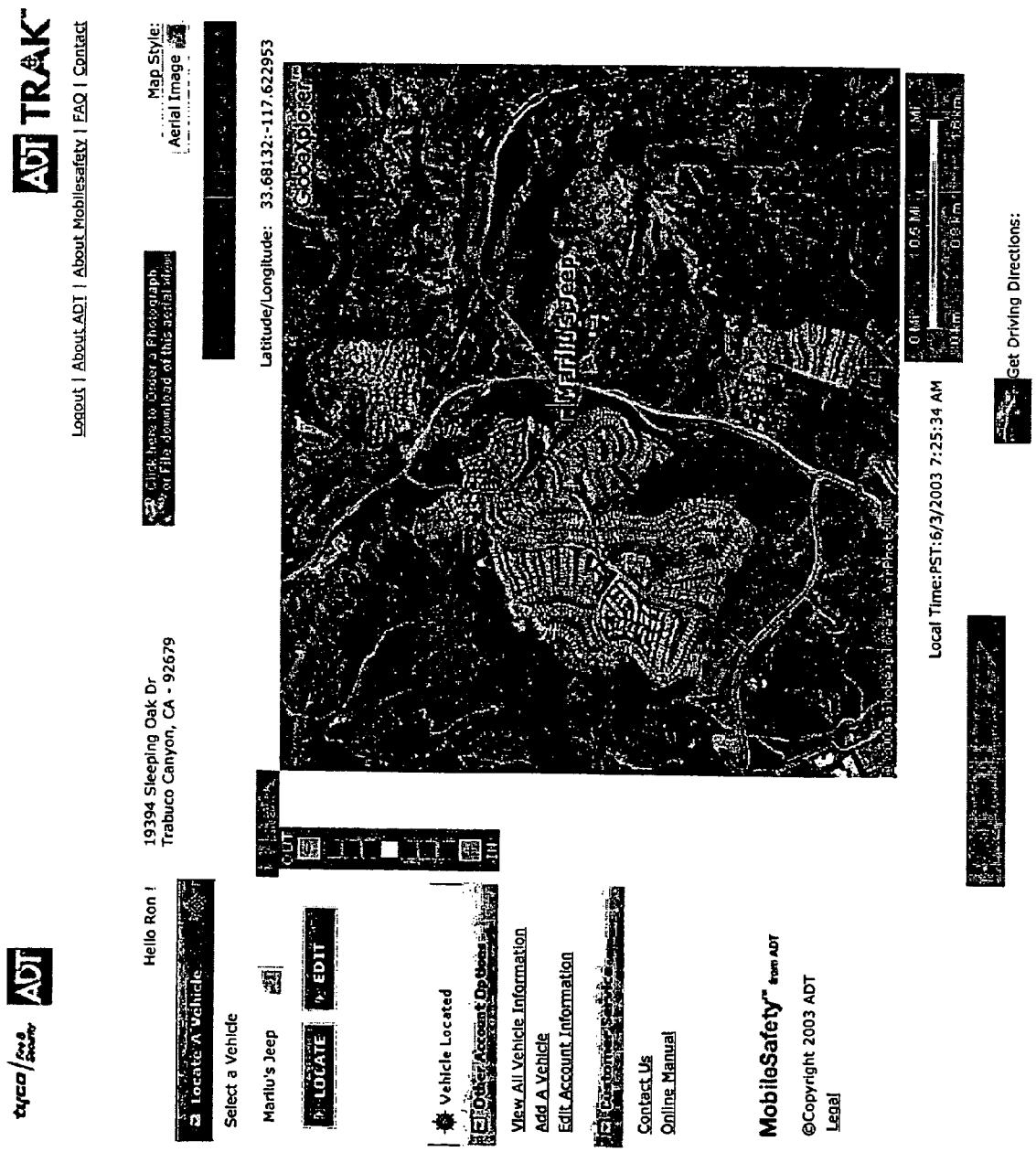
FIG. 6 depicts a third customer interface screen according to a preferred embodiment of the invention.

In the preferred embodiment, the registration portal 91 includes the functional components listed in Table VI.

assets. Preferably, asset track histories are maintained for billing and customer service purposes. At the customer portal 92, the user identifies the asset they wish to locate. (See FIG. 4.) The system 10 transfers this request to a telephony server, which is preferably a component of the cellular communication network 30, and the telephony server sends a signal to the GPS device. Upon receipt of the signal from the telephony server, the mobile unit 20 generates the GPS coordinates (longitude and latitude) of the mobile unit 20, and transmits the GPS coordinates to the central processing system 40. The system 40 places a location mark on a road map (See FIG. 5), or an aerial photo. (See FIG. 6.) In the preferred embodiment, the customer can also get written directions and highlighted map direction from or to the asset from or to any address or place of interest.

Figure 8:
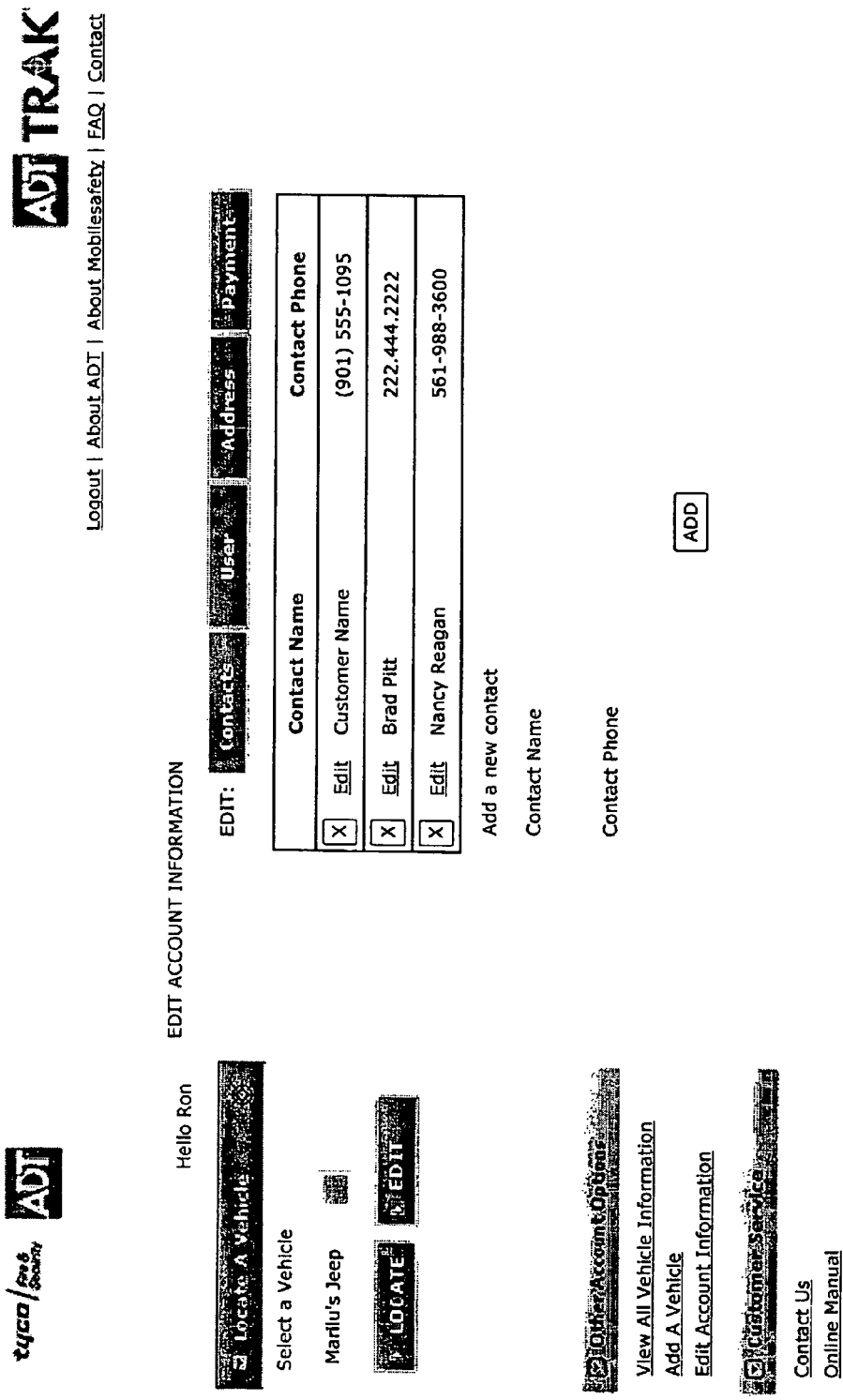
FIG. 8 depicts a fifth customer interface screen according to a preferred embodiment of the invention.

Through the customer portal 92, the customer can remove, add and modify assets in their list of assets. (See FIGS. 7 and 8.) Through the customer portal 92, the customer may also update their information so that the service provider has the most up to date billing and contact information in the customer database 44. (See FIG. 9.)

Thus, using the customer portal 92, the customer may: (1) log into the system 10 to use any of the features; (2) select from their available assets; (3) issue a tracking request; (4) view a map with a push pin depicting the location of the asset; (5) request driving directions from their asset location to different location; (6) purchase roadside assistance (for which the customer is billed monthly); (7) remove, add and modify assets in their list of assets; and (8) update their information so the service provider has the most up to date billing and contact information in the customer database 44.

TABLE VI

| | |
| --- | --- |
| Locating customer account. | This is the first step in the registration portal. The customer completes a short web form providing information that identifies them. |
| Cannot identify customer. | The system tries to identify using different logic like requesting other information that could help in identifying the customer. In case a match cannot be made, an informative error message is displayed along with details to contact customer service for further assistance. |
| Gathering Login information | The system requests the customer create a new login account along with other security information, so the customer can login to the system. |
| Gathering Billing/Payment Information | The system requests customer's billing address and the payment information. |
| Acknowledging terms of service and privacy policies | The customer agrees to the terms of service and privacy policies. This may be provided as a link or inline for them to review and accept the agreement terms. |
| Pre-Authorization of payment and account activation. | Once the payment information is collected, the system will pre-authorize for an amount that will be determined by the service provider. Successful pre-authorization activates the customer's account. The service provider could query this information through a web service or other means to activate the device, so that the customer will be able to participate in the tracking system. |

In the preferred embodiment, the customer portal 92 is where the customer views the tracking information for their In the preferred embodiment, the customer portal 92 includes the functional components listed in Table VII.

TABLE VII

| | |
|---|---|
| Customer login | Customer logs into the system using their username and password they selected during the registration process. |
| Login failure | If login fails more than two times, the customer is offered their secret question to reset the password. If the answer does not match, they will be provided with the contact information for customer service. |
| Asset list | List of customer's assets are displayed for the customer to select an asset to perform other functions, such as tracking the asset. The asset list is displayed as a tabular grid, with the fields listed in Table VIII. |
| Asset tracking | When the customer selects a particular asset from the asset list, the system starts the asset tracking sequence, providing the customer with the status of tracking and returning the map for the location of asset. Asset tracking consists of two modules: (1)location of asset; and (2) rendering the map using the mapping module, such as using MapPoint.NET services. |
| Asset tracking failure | If the asset cannot be tracked, the customer will be provided additional error messages for such failure. |
| Driving directions | Once an asset is located, the customer can determine directions to any given location from their asset. |
| Unable to obtain driving directions. | In case the system is unable to provide driving directions to the destination address that the customer specified, the customer will be provided any error messages. |
| Purchasing road side assistance. | The customer can purchase roadside assistance program. Any such purchases will be monthly billable. |
| Adding assets. | The customer is able to add new assets. The customer must have the required information needed to add an asset |
| Modifying and removing assets. | The customer can also modify their asset description and other allowed information that the system permits them to modify. The customer may also remove an asset from their asset list. |
| Updating customer information. | The customer can update their billing and contact information so that customer service provider will have the up to date information about the customer. |

TABLE VIII

| Mapping to ADT Track Table Field | Description |
|---|---|
| SAT_CUST_ASSETS->AssetID | This is the unique ID for the asset. This field will link to initiating a track request for the asset. |
| SAT_CUST_ASSETS->Asset_Decription | The description for the asset provided by the customer. |
| SAT_CUST_ASSETS->Make_Model_Year | The vehicle information. |
| SAT_CUST_ASSETS-RoadSide_Asst_Prov | The road side assistance provider for the vehicle. |
| SAT_CUST_ASSETS-RoadSide_Member_Number | The road side member account number of the customer with the provider. |
| SAT_CUST_ASSETS-RoadSide_Number | The phone number the customer can call for road side assistance. |

In the preferred embodiment, after the customer logs in and selects an asset, the AssetID is passed to the asset location web form. On successfully locating an asset, the location is preferably returned in a structure as shown below:
ASSET_LOCATION STRUCTURE
Latitude
Longitude
GPSTime
GPSUpdated
Status Once the central processing system 40 gets this information, the asset tracking module uses this information to render the map using the mapping module 70, such as the Mappoint.NET module. Asset tracking module proceeds according to the following preferred procedure:

1. Locate MIN # for the asset, where MIN # is the outbound number that will be passed to the telephony server. Preferably, MIN# is obtained by passing the AssetID of the selected asset from Table IX.

TABLE IX

| Mapping to ADT Track Table Field | Description |
|---|---|
| SAT_DEVICE_UNITS->AssetID | The AssetID of the selected asset. |
| SAT_DEVICE_UNITS->MIN | The outbound number that will be returned. |

2. Obtain WorkStationID, which is an identifier for an available line on the telephony server by executing the following stored procedure:
WEBTITC_DISPATCH_AVAILABLE( )@WorkStationID, @Return, where the Return parameter values are set forth in Table X.

TABLE X

| Return parameter values | Description |
|---|---|
| −1 | The telephony server is busy |
| A one-zero value other than −1 | Possibly an error occurred. The application will convey this error by displaying the error number/Return value. |

3. Call the following stored procedure to initiate an outbound call to the mobile device 20:

WEBTITC_COMMAND_SUBMIT(@WorkStationID, @Command, @OutBound#) @Return where the parameter values are described in Table XI, and the return parameter value is described in Table XII.

TABLE XI

| Parameter Values | Description |
| --- | --- |
| @WorkStationID | The line ID previously obtained. |
| @OutBound | The Min# previously obtained. |
| @Command | The value passed will be "Locate" |
| @Return | This is a return value obtained as a result of executing the stored procedure. |

TABLE XII

| Return parameter values | Description |
| --- | --- |
| A non-zero value other than −1 | Possibly an error occurred. The application will convey this error by displaying the error number/Return value. |

4. Call the following stored procedure to perform call progress detection and provide the status of the call to the user:

WEBTITC_PROGRESS(@WorkStationID) @Return, @Progress, @Result where the parameter values are described in Table XIII and the return parameter value is described in Table XIV.

TABLE XIII

| Parameter Values | Description |
| --- | --- |
| @WorkStationID | The line ID previously obtained. |
| @Return | This is a return value obtained as a result of executing the stored procedure. |
| @Progress | This is a return value that contains the progress status. |
| @Result | This is a return value that contains the result of the call. Along with the @Return parameter, this parameter provides a way to confirm that the call was successful or not. When a value of "OK" is returned, the call is completed and the device is located at that instance. |

TABLE XIV

| Return parameter values | Description |
| --- | --- |
| A non-zero value other than −1 | Possibly an error occurred. The application will convey this error by displaying the error number/Return value. |

The preferred embodiment includes a mechanism to show the call progress, such as by using an IFrame or repeatedly loading a status image from the server or requesting other objects like flash files or using a Java applet.

5. Obtaining the record containing the GPS information after an @Result="OK" is accomplished by executing the following stored procedure:

WEBTITC_READ(@WorkStationID) @Return where the Return parameter values are described in Table XV.

| Return parameter values | Description |
| --- | --- |
| A non-zero value other than −1 | Possibly an error occurred. The application will convey this error by displaying the error number/Return value. |
| 0 | A row will be available containing the following information: Longitude, Latitude, GPSUpdated and GPSTime |

Once the location of the asset is established according to the above procedure, the mapping module 70, such as the MapPoint.NET service, is used to render the map of the location.

The customer service portal 93 provides for responding to and servicing user inquiries sent to the service provider.

The data exchange portal 94 provides for accumulating and disseminating data, such as billing data.

The shipping portal 95 provides shipping information for a mobile device 20 after it is shipped to the customer. Shipping information is updated by uploading a CSV file through the warrant portal. (See FIG. 3.) After a successful upload, an email is preferably sent to the service provider. The functional components of the shipping portal according to a preferred embodiment are listed in Table XVI.

TABLE XVI

| | |
| --- | --- |
| CSV File Upload | The service provider logs into the system and uploads the CSV file through the upload interface provided in the warrant portal. The CSV file uploaded contains updated information related to a mobile unit shipment to a customer. |
| Upload Confirmation | Provide upload confirmation or errors if the upload was not successful. |
| CSV parsing: CSV Fields to ADT Track Table(s) field mapping | Parse the CSV file for required data and transfer the data to corresponding table fields within the tracking system. |
| CSV parse Error | In case of parse error an email will be sent to the appropriate entity for troubleshooting. Parse error may result because of invalid format of data or unable to match existing records to update the shipping information. |
| CSV parse OK | Send an email after successful parsing of the CSV file. |

According to the procedure described above, a single set of location coordinates are transmitted from the mobile unit 20 to the central processing system 40 when the mobile unit 20 receives the appropriate signal from the central processing system 40. However, it should be appreciated that coordinates for more than one location may be communicated in a single transmission. For example, the mobile unit 20 may be programmed to take GPS position readings periodically, such as every 30 minutes, and store those readings with corresponding timestamps in the memory 21 of the mobile unit 20. These stored readings may be later uploaded during a single transmission to the central processing system 40.

It will also be appreciated that more than one position indicator (such as a "push pin") may be displayed on a map or aerial photograph. For example, a series of positions may be overlaid on the map or photograph to depict the movements of an asset over a period of time.

Computer Program Listing

A computer program listing appendix is submitted herewith on a single compact disc, the files of which are incorporated herein by reference.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally, and equitably entitled.

What is claimed is:

1. An asset location tracking system for tracking the position of a mobile asset via a global communication network, the system comprising:
    an aerial image database accessible via the global communication network;
    a mobile unit collocated with the mobile asset, the mobile unit comprising:
        a first wireless receiver for receiving at least an activation signal;
        a position locating unit for generating position information indicative of the position of the mobile unit;
        a dual-tone multi-frequency (DTMF) modulator for generating DTMF tones based at least in part on the position information; and
        a first wireless transmitter for transmitting the DTMF tones;
    a central processing system in communication with the global communication network, the central processing system comprising:
        a second wireless transmitter for transmitting at least the activation signal;
        a second wireless receiver for receiving the DTMF tones transmitted by the first wireless transmitter; and
        a processor for operating on the DTMF tones to extract the position information and for formatting the position information to be accessible via the global communication network,
        the central processing system for accessing the aerial image database over the global communication network to generate an aerial image of terrain corresponding to the location of the mobile unit, and for generating a position indicator on the aerial image corresponding to the position of the mobile unit based on the position information; and
    a customer computer in communication with the global communication network for accessing the aerial image and the position indicator via the global communication network.

2. An asset location tracking system for tracking the position of a mobile asset via a global communication network, the system comprising:
    a mobile unit collocated with the mobile asset, the mobile unit comprising:
        a first wireless receiver for receiving at least an activation signal;
        a position locating unit for generating position information indicative of the position of the mobile unit;
        a dual-tone multi-frequency (DTMF) modulator for generating DTMF tones based at least in part on the position information; and
        a first wireless transmitter for transmitting the DTMF tones;
    a customer database for storing customer information regarding a customer associated with the mobile unit, the customer information including a list of one or more mobile units associated with the customer;
    a central processing system in communication with the global communication network, the central processing system comprising:
        a second wireless transmitter for transmitting at least the activation signal;
        a second wireless receiver for receiving the DTMF tones transmitted by the first wireless transmitter; and
        a processor for operating on the DTMF tones to extract the position information and for formatting the position information to be accessible via the global communication network,
        the central processing system for generating a graphical representation of the list of one or more mobile units associated with the customer;
    a customer computer in communication with the global communication network, the customer computer for accessing the graphical representation of the list of one or more mobile units via the global communication network and for selecting one or more of the mobile units from the list based on input from the customer; and
    the second wireless transmitter for transmitting the activation signal to the one or more mobile units selected from the list.

3. A computer based method for tracking a location of a mobile asset, the method comprising:
    (a) providing an asset tracking webpage accessible via a global communication network;
    (b) accessing the asset tracking webpage using a customer computer in communication with the global communication network;
    (c) displaying on the asset tracking webpage a list of one or more mobile units associated with a customer;
    (d) selecting from the list a mobile unit to track;
    (e) transmitting a wireless activation signal to the mobile unit;

(f) receiving the wireless activation signal at the mobile unit;

(g) generating first position information at the mobile unit upon receipt of the wireless activation signal;

(h) wirelessly transmitting the first position information from the mobile unit;

(i) receiving the first position information;

(j) accessing a map of an area that includes the location indicated by the first position information;

(k) generating a position indicator corresponding to the location indicated by the first position information;

(l) associating the position indicator with the map to form an annotated map;

(m) accessing the annotated map on the tracking webpage via the global communication network using the customer computer; and (n) displaying the annotated map at the customer computer.

4. The method of claim 3 further comprising:

(o) entering second position information at the customer computer indicating a second location;

(p) based on the first position information and the second position information, determining a route from the position of the mobile asset to the second location; and (q) displaying the route on the annotated map at the customer computer.

5. The method of claim 3 further comprising:

(o) accessing an overhead photograph of an area that includes the location indicated by the first position information;

(p) associating the position indicator with the overhead photograph to form an annotated photograph;

(q) accessing the annotated photograph on the tracking webpage via the global communication network using the customer computer; and (r) displaying the annotated photograph at the customer computer.

6. The method of claim 3 further comprising displaying a graphic at the customer computer indicating progress of performance of one or more of steps (e)–(i).

7. The method of claim 3 further comprising removing a mobile asset from the list using the customer computer in communication with the asset tracking webpage.

8. The method of claim 3 further comprising adding a mobile asset to the list using the customer computer in communication with the asset tracking webpage.

9. The method of claim 3 further comprising modifying information associated with one or more mobile assets on the list using the customer computer in communication with the asset tracking webpage.

10. An asset location tracking system for tracking the position of a mobile asset via a global communication network, the system comprising:

a mobile unit collocated with the mobile asset, the mobile unit comprising:

a first wireless receiver for receiving at least an activation signal;

a position locating unit for generating position information indicative of the position of the mobile unit;

a dual-tone multi-frequency (DTMF) modulator for generating DTMF tones based at least in part on the position information;

a first wireless transmitter for transmitting the DTMF tones;

a power connector for connecting to a power source associated with the mobile asset, whereby the mobile unit receives power from the power source associated with the mobile asset via the power connector and whereby the mobile unit may be easily relocated from one mobile asset to another mobile asset; and a central processing system in communication with the global communication network, the central processing system comprising:

a second wireless transmitter for transmitting at least the activation signal;

a second wireless receiver for receiving the DTMF tones transmitted by the first wireless transmitter; and a processor for operating on the DTMF tones to extract the position information and for formatting the position information to be accessible via the global communication network; and a customer computer in communication with the global communication network for accessing the position information via the global communication network.

11. A computer based method for tracking a location of a mobile asset, the method comprising:

(a) providing an asset tracking webpage accessible via a global communication network;

(b) accessing the asset tracking webpage using a customer computer in communication with the global communication network;

(c) selecting a mobile unit to track using the customer computer and the asset tracking webpage;

(d) transmitting a wireless activation signal to the mobile unit;

(e) receiving the wireless activation signal at the mobile unit;

(f) generating position information at the mobile unit upon receipt of the wireless activation signal;

(g) wirelessly transmitting the position information from the mobile unit;

(h) receiving the position information;

(i) accessing an overhead photograph of an area that includes the location indicated by the position information;

(j) associating the position indicator with the overhead photograph to form an annotated photograph;

(k) accessing the annotated photograph on the tracking webpage via the global communication network using the customer computer; and (l) displaying the annotated photograph at the customer computer.

12. A computer based method for viewing information regarding a mobile asset from an asset tracking webpage that is accessible via a global communication network, the method comprising:

(a) accessing the asset tracking webpage using a customer computer in communication with the global communication network;

(b) displaying on the asset tracking webpage a list of one or more mobile units associated with a customer;

(c) selecting a mobile unit to track from the list;

(d) issuing a tracking request to determine a location of the selected mobile unit;

(e) viewing a map on the customer computer depicting the location of the selected mobile unit; and (f) requesting driving directions from the location of the selected mobile unit to a different location.

13. The method of claim 12 further comprising modifying information about one or more mobile units listed in the list of mobile units associated wit the customer using the customer computer in communication with the global communication network.

14. The method of claim 13 further comprising adding or removing one or more mobile units from the list of mobile units associated with the customer using the customer computer in communication with the global communication network.

15. The method of claim 12 further comprising purchasing roadside assistance services for a mobile asset associated with a mobile unit listed in the list of mobile units using the customer computer in communication with the global communication network.

* * * * *